United States Patent [19]
LePelley

[11] Patent Number: 5,401,070
[45] Date of Patent: Mar. 28, 1995

[54] ARTICLE FOR PULLING A CHILD'S TOY

[76] Inventor: Kelly L. LePelley, 7406 Andover Way, Hudson, Ohio 44236

[21] Appl. No.: 95,084

[22] Filed: Jul. 20, 1993

[51] Int. Cl.6 .......................... B62B 9/00; B65G 7/00
[52] U.S. Cl. .............................. 294/1.1; 280/47.371; 280/292; 280/480; 294/156
[58] Field of Search .............. 294/1.1, 31.2, 74, 82.11, 294/82.14, 137, 147–156, 165, 170; 16/110 R, 114 R, 114 B, 125; 24/115 R, 115 H, 115 K, 129 R, 129 A, 197–200; 119/769, 772, 774, 776, 792–795, 801–805; 280/1.5, 18–20, 24, 47.11, 47.17, 47.315, 47.34, 47.371, 87.01, 87.021, 210, 242.1, 288.4, 292, 293, 295, 304.5, 480, 482, 727; 224/184; 446/450–453; 441/69

[56] References Cited

U.S. PATENT DOCUMENTS

| 251,996 | 1/1882 | Callahan | 294/82.14 X |
|---|---|---|---|
| 1,403,607 | 1/1922 | Kunst | 280/87.021 |
| 1,578,107 | 3/1926 | Tippit | 280/480 |
| 1,601,270 | 9/1926 | Tippett | 280/480 |
| 1,772,420 | 8/1930 | Harris | 280/480 |
| 2,629,611 | 2/1953 | Covington | 280/292 |
| 2,645,505 | 7/1953 | Durand | 280/292 X |
| 3,100,120 | 8/1963 | Cleary | 280/87.01 |
| 4,285,529 | 8/1981 | Vaillancourt | 280/24 X |
| 4,718,684 | 1/1988 | Rabatic | 280/20 |
| 5,180,178 | 1/1993 | Caceres | 280/47.34 |

FOREIGN PATENT DOCUMENTS

| 1237458 | 6/1960 | France | 119/793 |
|---|---|---|---|
| 173557 | 7/1906 | Germany | 294/156 |
| 616499 | 7/1935 | Germany | 280/480 |
| 677353 | 6/1939 | Germany | 294/150 |
| 13115 | of 1906 | United Kingdom | 280/292 |
| 2109215 | 6/1983 | United Kingdom | 119/793 |

Primary Examiner—Johnny D. Cherry
Attorney, Agent, or Firm—Roger D. Emerson

[57] ABSTRACT

A strap for pulling a child's wheeled toy has a handle for enabling a user to better grip a first end of the strap and a slotted ring attached to a second end of the strap. Middle portions of the strap can be fitted through the ring and placed around a yoke of a tricycle or wagon or other wheeled child's toy to enable an adult to more easily pull a small child on the wheeled toy.

8 Claims, 2 Drawing Sheets

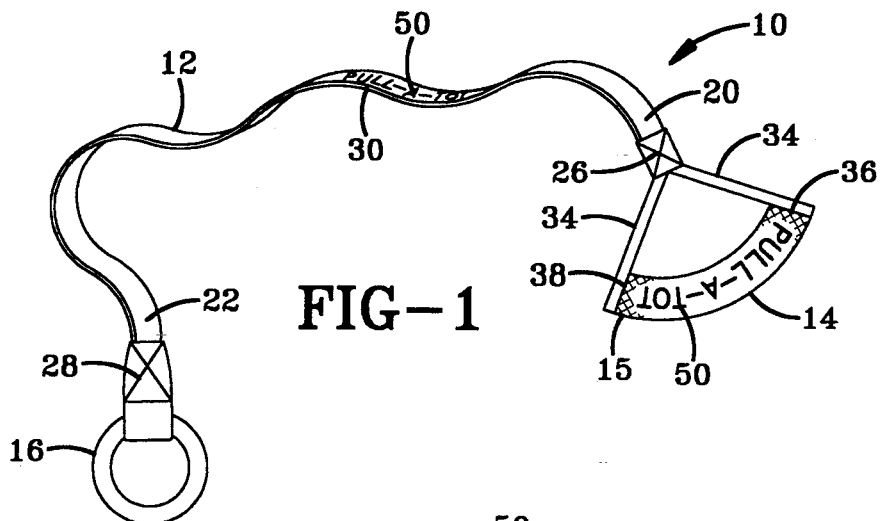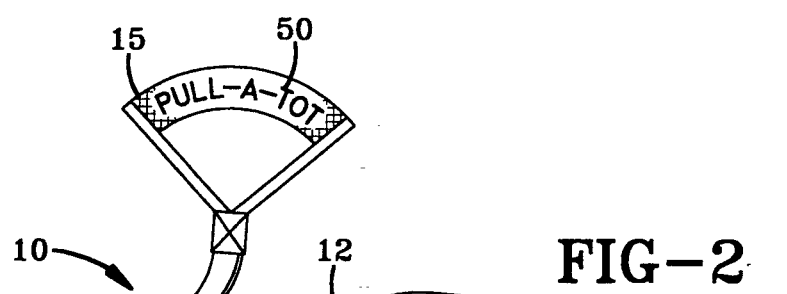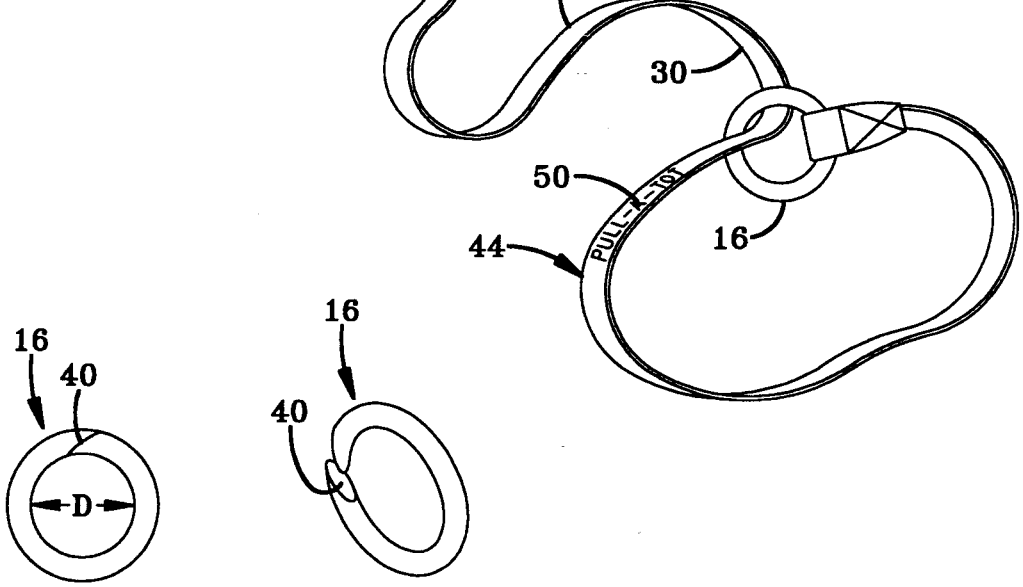

ARTICLE FOR PULLING A CHILD'S TOY

BACKGROUND OF THE INVENTION

1. Field of Invention

This invention relates to an article for pulling wheeled vehicles, and more particularly to an article for pulling a wheeled child's toy such as a wagon or a tricycle.

2. Description of Related Art

Children's wagons and tricycles are well-known. Due to their being sized for use by small children, they are necessarily smaller and lower than can conveniently be grasped by adults. When infants and small children are learning to ride tricycles or wish to ride in a wagon, it is common for an adult to pull the child's tricycle or wagon or other wheeled vehicle around the block on a sidewalk. While this is enjoyable for the child, it is often difficult and uncomfortable for the adult due to the awkwardness of bending over to pull the tricycle or wagon while walking. Because of this difficulty some such rides are invariably cut short.

The present invention contemplates a new and improved article which is simple in design, effective in use, and overcomes the foregoing difficulties and others while providing better and more advantageous overall results.

SUMMARY OF THE INVENTION

In accordance with the present invention, a new and improved article for pulling a child's toy is provided which is adapted to assist an adult in pulling a wheeled vehicle.

More particularly, in accordance with the invention, the article includes a strap, gripping means and attaching means. The strap has first and second ends and a length. The gripping means enables a user to better grip the first end of the strap and is attached to the first end of the strap. The attaching means is attached to the second end of the strap and is effective to connect the article to the wheeled toy.

According to another aspect of the invention, the attaching means is a stainless steel ring having a 45 degree slot and a diameter of about 1 to 3 inches.

According to another aspect of the invention, the gripping means is a handle which has opposite ends. Extensions are connected to the opposite ends to connect the handle to the first end of the strap. The handle is comprised of a tubular cord covered by rubber mesh.

According to another aspect of the invention, the strap is made of nylon and is between 6 feet and 12 feet long.

According to another aspect of the invention, a method of pulling an associated child's toy comprises steps of forming a loop by pushing a middle portion of a strap through a ring, placing the loop over a portion of the associated toy, tightening the loop by pulling on the handle, and pulling the associated toy by continuing to pull on the handle.

According to another aspect of the invention, a method of pulling an associated child's toy comprises steps of forming a loop by pushing a middle portion of a strap through a slot in a slotted ring, placing the loop over a portion of the associated toy, tightening the loop by pulling on the handle, and pulling the associated toy by continuing to pull on the handle.

One advantage of the present invention is a low cost, simple device which is easily stored, strong, and effective in pulling a child's wheeled vehicle.

Another advantage is the raising of a pulling point farther above the ground. For example, if an adult must pull on the actual handle of the wagon or the handle bars of a tricycle, that point is necessarily low due to the size of the child. By using the inventive article disclosed herein, this point of contact between the article to be pulled and the adult's hand is higher. By making this point higher, the adult can pull from an erect walking position, leading to healthier posture, less fatigue and chance of injury.

Yet another advantage of the invention is the ability to allow a toddler to peddle a tricycle up inclines while receiving only the requisite amount of assistance from the adult. This enables the toddler to feel like he is climbing the incline himself and also allows the toddler to exercise by resisting the force of gravity up the incline.

A yet further advantage of the present invention is the increased safety afforded to the toddler by having the wheeled vehicle connected to an adult's hand. Whether going up an incline or down, or otherwise deviating from a sidewalk on a level surface, the inventive apparatus enables the parent to maintain a degree of control over the wheeled vehicle even while looking forward and not watching it.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 is a perspective view of a pulling article according to the invention;

FIG. 2 is a perspective view of a pulling article according to the invention with a middle portion of the strap passed through a slot in the slotted ring;

FIG. 3 is a plan view of a slotted ring;

FIG. 4 is a perspective view of a slotted ring with the slot shown in an exaggerated open position for clarity;

DESCRIPTION OF THE PREFERRED EMBODIMENT

Figure 5:
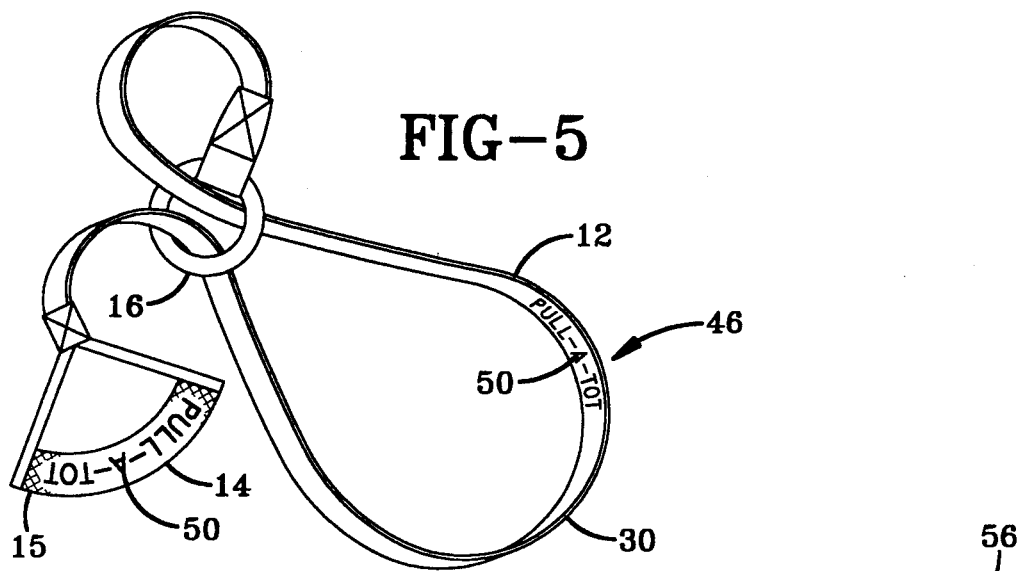
FIG. 5 is a perspective view of a pulling article according to the invention with a middle portion of the strap pulled through the ring.

Referring now to the drawings where the showings are for purposes of illustrating a preferred embodiment of the invention only and not for purposes of limiting the same, FIG. 1 shows a pulling article 10 according to the invention. The pulling article comprises a strap 12, a handle 14 and a ring 16.

The strap 12 has a first end 20 and a second end 22. The first end 20 is attached to the handle 14. In a preferred embodiment, this attachment is effected by folding over the first end 20 of the strap end 12 and stitching it together as shown at 26. Similarly, the second end 22 of the strap 12 is affixed to the ring 16 by a similar attaching technique at 28.

In a preferred embodiment, the strap is made of nylon and has a length between 3 feet and 15 feet. In a preferred embodiment, the length is 6 feet to 9 feet. Depending on the height of the person to pull the wheeled toy, as well as the height of the wheel toy, different lengths of pulling articles 10 might be best. It is foreseeable that the length of the pulling article could be adjusted to accommodate such needs. In such case, an adjusting means, such as a slip knot, could be added to the strap 12. In another embodiment, one of the ends 20, 22 of the strap 12 could be fitted with an adjustment means to adjust the length of the strap 12. The strap has a middle portion 30 which is generally defined as any point between the first end 20 and the second end 22. The use of the middle portion 30 will be discussed later.

The handle 14 is preferably tubular and has a slight arc to better fit the hand of the adult who is to pull the wheeled toy. In a preferred embodiment, the tubular handle 14 is covered with a rubber mesh 15. The rubber mesh improves the user's grip while often increasing his comfort. In the embodiment shown in FIG. 1, extensions 34 extend from either end 36,38 of the handle 14 and connect the ends 36,38 to the first end 20 of the strap 12. In a preferred embodiment, the handle 14 features decorative indica 50. This indica 50 can be the child's name, the name of the product itself, or the name of an entity giving away the pulling article as a promotion such as a day-care or school. Indicia 50 can also be conveniently placed on the strap 12.

With reference to FIGS. 1, 3 and 4, a ring 16 is shown. In the preferred embodiment, the ring is made of stainless steel and is a diameter D between 1 inch and 3 inches. In one embodiment, the ring 16 includes a slot 40. In FIG. 4, the slot 40 is shown in an exaggerated open position. The use of the slot 40 will be discussed later.

With continuing reference to FIGS. 2-4, one method of attaching the pulling article 10 to the child's wheeled toy is by threading the middle portion 30 of the strap 15 through the slot 40 and ring 16. By doing so, a loop 44 is created which can be placed over an appropriate part of a child's wheeled toy. For example, with reference to FIGS. 6 and 7, such a loop 44 is shown being attached to a handle of a wagon 56 or the yoke 60 of tricycle 58 handle bars 62, respectively.

Figure 6:
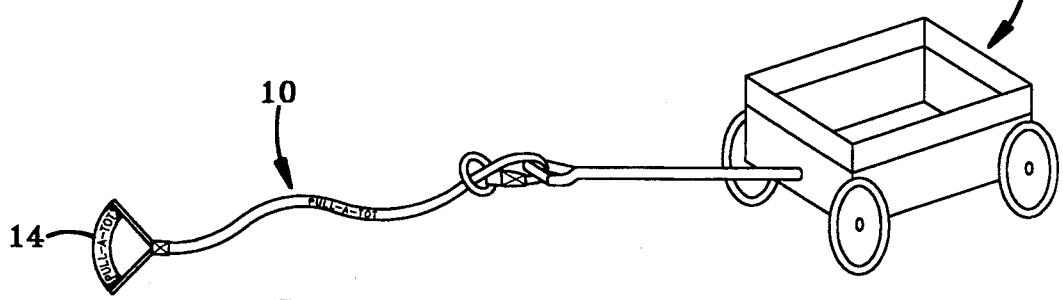
FIG. 6 is a schematic perspective view of a pulling article according to the invention attached to a child's wagon; and, FIG. 7 is a schematic view of a pulling article according to the invention attached to the yoke of a tricycle.
Figure 7:
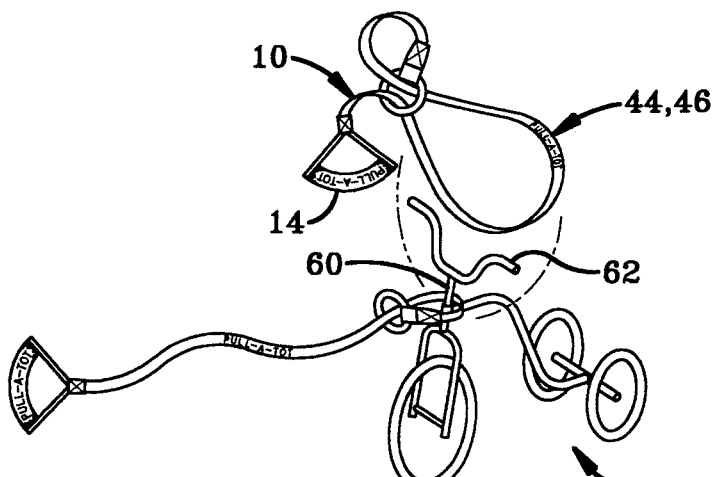

With reference to FIG. 5, a second method of forming a loop 46 is shown. In this method, the middle portion 30 of the strap 12 is pushed through the center of ring 16 to form a loop 46. The loop 46 can be attached to an appropriate portion of a child's wheeled toy as shown in FIGS. 6 and 7.

The invention has been described with reference to a preferred embodiment. Obviously, modifications and alterations will occur to others upon a reading and understanding of this specification. It is intended to include all such modifications and alterations insofar as they come within the scope of the appended claims or the equivalence thereof.

Having described the invention, it is now claimed:

1. An article for pulling a child's wheeled toy, said article comprising:
   a strap, said strap having first and second ends and a length;
   a handle, said handle for enabling an associated user to better grip said first end of said strap, said handle being attached to said first end of said strap, said handle having opposite ends, extensions connecting said opposite ends of said handle to said first end of said strap, said handle being comprised of a tubular core, said handle comprising a portion of an arc; and,
   attaching means for attaching said second end of said strap to said toy.

2. The article of claim 1 wherein said article further comprises:
   rubber mesh, said handle being covered by said rubber mesh.

3. The article of claim 1 wherein said strap is made of nylon.

4. The article of claim 1 wherein said length of said strap is between three feet and fifteen feet.

5. The article of claim 1 wherein said portion of said arc is less than 180 degrees.

6. The article of claim 1 wherein said strap bears indicia.

7. The article of claim 6 wherein said handle bears indica.

8. An article for pulling a child's wheeled toy, said article comprising:
   a strap, said strap having first and second ends and a length;
   a handle, said handle for enabling an associated user to better grip said first end of said strap, said handle being attached to said first end of said strap, said handle having opposite ends, extensions connecting said opposite ends of said handle to said first end of said strap, said handle being comprised of a tubular core;
   a rubber mesh, said rubber mesh covering said handle; and,
   attaching means for attaching said second end of said strap to said toy.

* * * * *